United States Patent [19]
Conroy, Sr.

[11] Patent Number: 5,832,951
[45] Date of Patent: Nov. 10, 1998

[54] PNEUMATIC CONTROL

[76] Inventor: Joseph P. Conroy, Sr., 4375 Hickory Ridge, Brunswick, Ohio 44212

[21] Appl. No.: 630,005

[22] Filed: Apr. 8, 1996

[51] Int. Cl.⁶ .................................................. B60C 23/00
[52] U.S. Cl. ........................................... 137/230; 137/224
[58] Field of Search ..................... 137/230, 224; 152/427, 417, 418, 415

[56] References Cited

U.S. PATENT DOCUMENTS

| | | | |
|---|---|---|---|
| 4,660,590 | 4/1987 | Sanchez | 137/230 |
| 4,700,763 | 10/1987 | Williams | 137/522 |
| 4,730,656 | 3/1988 | Goodell et al. | 137/224 |
| 5,181,977 | 1/1993 | Gneiding et al. | 137/224 |
| 5,295,504 | 3/1994 | Riquier et al. | 137/230 |
| 5,398,744 | 3/1995 | Street et al. | 137/230 |

*Primary Examiner*—Marguerite McMahon
*Attorney, Agent, or Firm*—David R. Percio

[57] ABSTRACT

A pneumatic control apparatus and method controls gas pressure inside a tire mounted on a wheel which rotates about the centerline of an axle. A bleeder valve is mounted on a body coaxially aligned with the axle centerline and is in fluid connection with a pneumatic fitting on the tire. The bleeder valve allows gas inside the tire to be relieved to the atmosphere when the gas is above a set pressure. The coaxial alignment of the bleeder valve with the axle centerline permits the bleeder valve to relieve gas pressure unaffected by centrifugal forces.

19 Claims, 3 Drawing Sheets

PNEUMATIC CONTROL

TECHNICAL FIELD

This invention relates to the construction of a race car tool. Specifically this invention relates to a pneumatic device to control air or nitrogen pressure in a race car tire.

BACKGROUND ART

Air or nitrogen bleeders were invented to control a pre-determined amount of air or nitrogen in a race car tire. They were designed to be installed in the outside diameter of the wheel, either in the valve stem hole or by drilling a hole 180 degrees opposite the valve stem.

The tire bleeder is a round machined piece of aluminum approximately 5/8 inches in diameter and 3/4 inches long. It has a tapered seat, a poppet valve that is spring loaded against a knurled end cap. It is adjusted to the desired pounds by tightening or loosening the end cap. It is locked in position by a lock nut.

The problem that arises when the wheel is al high speed, is that centrifugal force works in an opposite direction of the poppet valve, thus adding more pressure on the poppet, and not letting it bleed off as desired. This causes the tire to grow in size, thus upsetting the balance of the race car.

Thus there exists the need for a method of regulating air or nitrogen pressure as desired, that is of a positive nature.

DISCLOSURE OF INVENTION

It is an object of the present intention to provide a pneumatic control.

It is the further object of the present invention to provide a pneumatic control that releases air from a race car tire.

It is the further object of the present invention to provide a pneumatic control that will work with no other forces that will impair its working characteristics.

It is the further object of the present invention to provide a pneumatic control that is easily installed in a race car axle.

The foregoing objects are accomplished in a preferred form of the pneumatic control of the present invention with a cylindrical shaped billet.

The cylindrical shaped billet has an annular shaped wall that extends longitudinally. The cylindrical shaped billet has an outside diameter of the desired axle it is to be installed in, and is approximately 1" in length.

The cylindrical shaped billet has a center hole of approximately 5/16 inches in diameter. The center hole of the cylindrical shaped billet is tapped 1/8–27 National Pipe Tap at each end.

The cylindrical shaped billet has a hole approximately 3/16 inches in diameter drilled approximately 1/2 inch off center.

The cylindrical shaped billet has a grove machined around the circumference approximately 1/8 inch deep and 1/8 inch from the outer end.

During operation the pneumatic control is installed in the race car axle and held in place with a 10–32 set screw, that has been installed in the race car axle.

The air or nitrogen in the tire is routed from the tire by means of approximately 5/32 inch natural poly tubing attached to a Delrin Acetal coupling.

The 5/32 inch natural poly tubing is routed from the wheel through the smaller, un-tapped hole in the pneumatic control and into the axle longitudinally. It is then returned 180 degrees and inserted in a Parker Prestolok fitting installed in the inner tapped hole in the pneumatic control;

In the outer tapped hole, a Delrin Acetal or brass coupling, or equivalent fitting is installed to accept the bleeder, thus completing the routing of air or nitrogen from inside the tire to the tire bleeder.

BEST MODE FOR CARRYING OUT INVENTION

Figure 1:
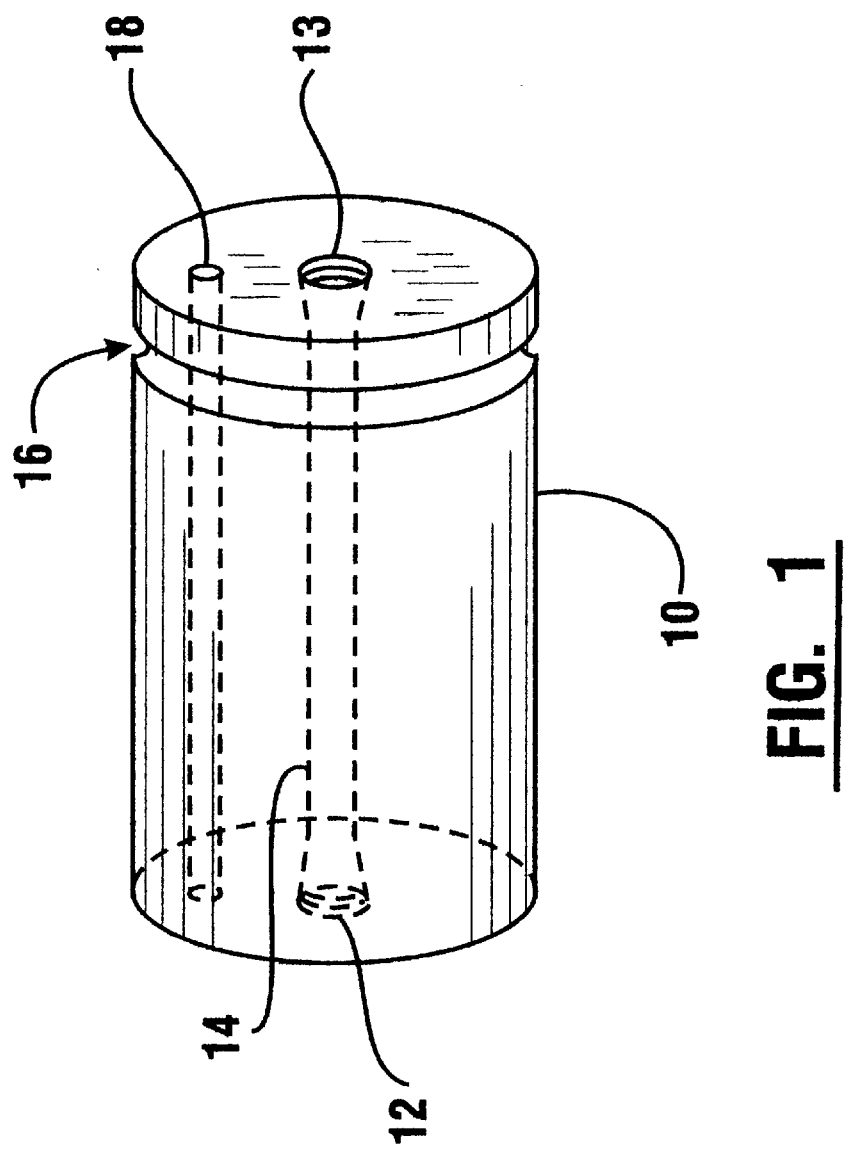
FIG. 1 is a cross sectional view of the cylindrical shaped billet of the pneumatic control of the preferred embodiment of the present invention.
Figure 2:
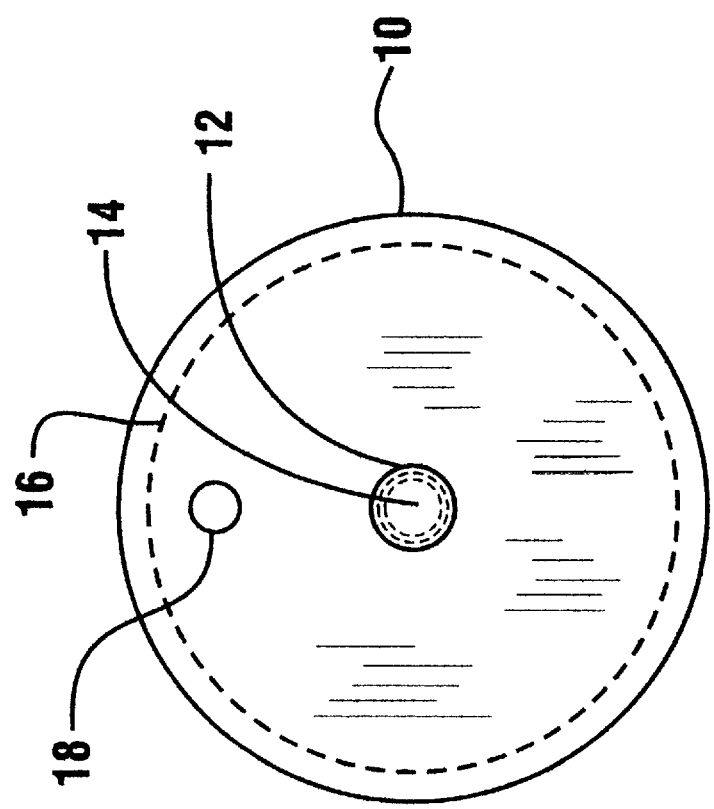
FIG. 2 is a side isometric view of the cylindrical shaped billet of the pneumatic control of the present invention.
Figure 3:
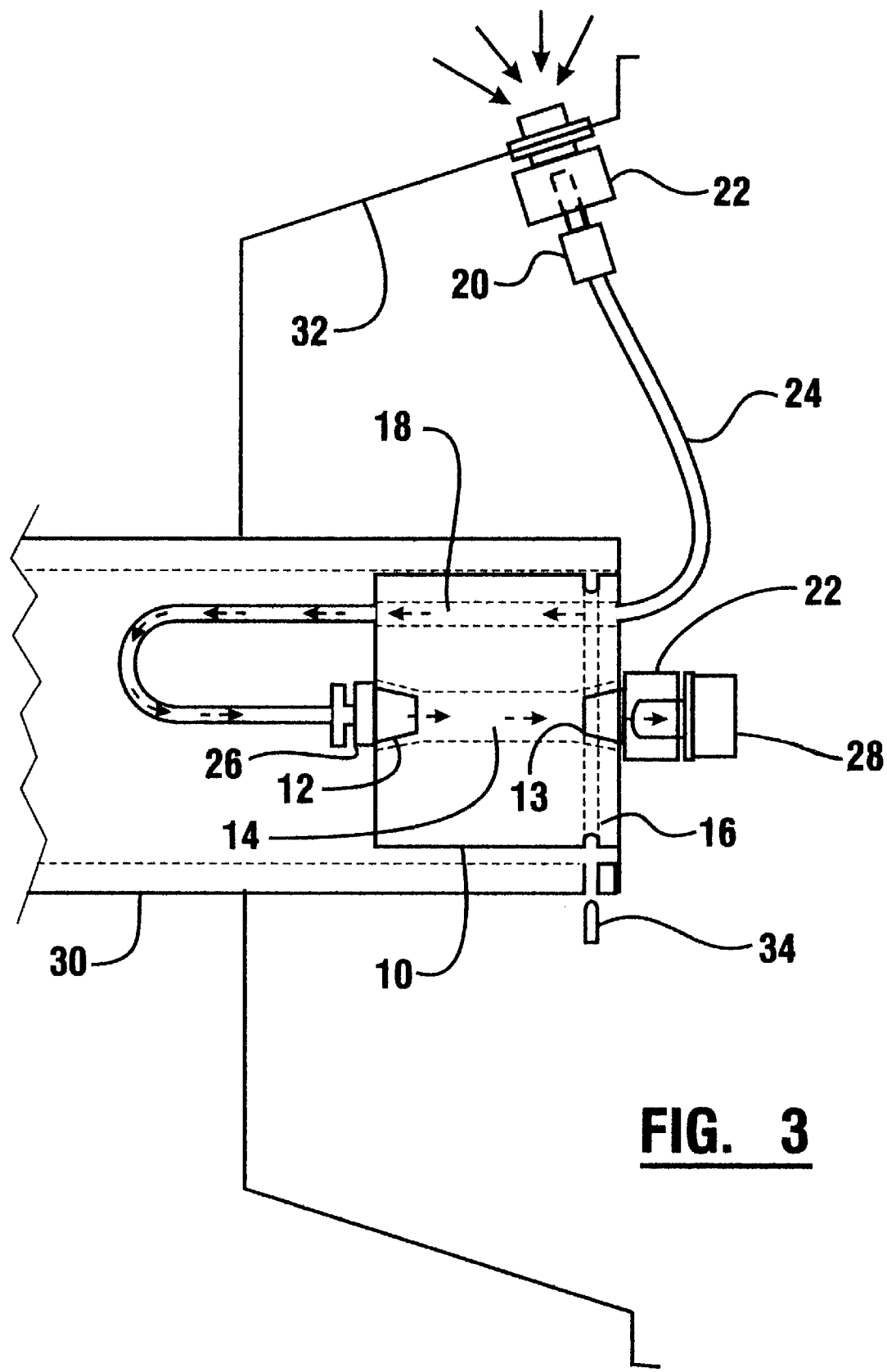
FIG. 3 depicts the entire method of operation of the pneumatic control of the present invention.

Referring now to the drawings and particularly to FIG. 3, there is shown therein the preferred embodiment of the pneumatic control of the present invention FIGS. 1 and 2 show, respectively, a cross section view and an isometric view of a cylindrical shaped billet 10. As shown therein, billet 10 has a center hole 14 with taps 12 and 13 at opposite ends of center hole 14. Billet 10 further has a second hole 18 offset from center hole 14. Billet 10 also has a circumferential groove 16 machined adjacent one end.

In the preferred embodiment of the invention billet 10 is approximately 1 inch in length and has an outside diameter selected to fit inside hollow axle 30. Center hole 14 is approximately 5/16 inches in diameter with a 1/8–27 National Pipe Thread (N.P.T.) taps 12, 13 at opposite ends. A second hole 18 approximately 3/16 inches in diameter is offset approximately 1/2 inch from center hole 14. Groove 16 is approximately 1/8 inch wide by 1/8 inch deep, and is located approximately 1/8 inches from one end of billet 10. Referring again to FIG. 3 the pneumatic control is shown with a Colder Products Company Delrin Acetal Coupling used for coupling 20 inserted into a Delrin Acetal Coupling 22 used for coupling. Natural poly tubing used for tubing 24 is inserted into coupling 20, and routed through horizontal 18 in billet 10. Tubing 24 then continues through hollow axle 30 and reverses 180 degrees to insert into a Parker-Hannifin Prestolok fitting used for fitting 26 threaded into tap 12 in center hole 14. At the billet 10 of the pneumatic control coupling 22 accept air bleeder 28, thus completing its cycle.

Thus the new pneumatic control of the present invention achieves the above stated objectives, eliminates difficulties encountered in the use of previous devices, solves problems, and attains the desirable results described herein.

In the foregoing description, certain terms have been used for brevity, clarity and understanding. However, no unnecessary limitations are to be implied therefrom because such items are for descriptive purposes and intended to be broadly construed. Moreover, the descriptions and illustrations are by way of examples and the invention is not limited to the details shown and described.

Further, in the following claims any feature described as a means for performing a recited function shall be construed as encompassing any means capable of performing the recited function and is not limited to the particular means described herein or mere equivalents.

Having described the features, discoveries and principles of the invention, the manner in which it is constructed and operated and the advantages and useful results attained; the new and useful structures, devices, elements, arrangements, parts, combinations, systems, equipment, operations and relationships are set forth in the appended claims.

I claim:

1. A pneumatic control apparatus for controlling gas pressure inside a tire mounted on a wheel, the wheel being rotatable in operative connection with an axle, wherein the axle is rotatable about an axle centerline, and wherein the wheel is in supporting connection with a pneumatic fitting, wherein the pneumatic fitting is in fluid communication with the inside of the tire, the apparatus comprising:

a body, wherein the body:
  has a circumferential groove;
  is releasably connectable to the axle by a set screw cooperatively engaging the axle and the groove; and
  is coaxially aligned with the axle centerline;
a bleeder valve mounted in supporting connection with the body, wherein the bleeder valve is coaxially aligned with the axle centerline, and wherein the bleeder valve enables gas above a set pressure to pass to atmosphere; and
a tube, wherein the tube fluidly connects the bleeder valve and the pneumatic fitting whereby gas above the set pressure is relieved from the tire.

2. The apparatus of claim 1 wherein the body is cylindrical.

3. A pneumatic control apparatus for controlling gas pressure inside a tire mounted on a wheel, the wheel being rotatable in operative connection with an axle, wherein the axle is rotatable about an axle centerline, and wherein the wheel is in supporting connection with a pneumatic fitting, wherein the pneumatic fitting is in fluid communication with the inside of the tire, the apparatus comprising:

a body wherein the body;
  is releasably connectable to the axle; and
  has a fluid passage terminating at a first opening on a surface of the body and originating at a second opening on a surface of the body;
a bleeder valve mounted in supporting connection with the body, wherein the bleeder valves:
  is coaxially aligned with the axle centerline;
  is in fluid connection with the first opening; and enables gas above a set pressure to pass to atmosphere; and
a tube, wherein the tube is in fluid connection with the second opening and fluidly connects the bleeder valve and the pneumatic fitting, whereby gas above the set pressure is relieved from the tire.

4. The apparatus of claim 3 wherein the first opening is in threaded connection with a coupling, and wherein the bleeder valve is in releasable connection with the coupling.

5. The apparatus of claim 3 wherein the second opening is in threaded connection with a fitting, and wherein the tube is in releasable connection with the fitting.

6. The apparatus of claim 3 wherein the first opening is in threaded connection with a coupling and wherein the second opening is in threaded connection with a fitting, and wherein the bleeder valve is in releasable connection with the coupling and the tube is in releasable connection with the fitting.

7. The apparatus of claim 3 wherein the body has a second passage terminating at a first opening on a surface of the body and originating at a second opening on a surface of the body, and wherein the tube passes through the second passage.

8. The apparatus of claim 7 wherein the first opening of the first passage is in threaded connection with a coupling, and wherein the bleeder valve is in releasable connection with the coupling.

9. The apparatus of claim 7 wherein the second opening of the first passage is in threaded connection with a fitting, and wherein the tube is in releasable connection with the fitting.

10. The apparatus of claim 7 wherein the first opening is in threaded connection with a coupling and wherein the second opening is in threaded connection with a fitting, and wherein the bleeder valve is in releasable connection with the coupling and wherein the tube is in releasable connection with the fitting.

11. A method for controlling gas pressure inside a tire mounted on a wheel, the wheel being rotatable in operative connection with an axle, wherein the axle is rotatable about an axle centerline, and wherein the wheel is in supporting connection with a pneumatic fitting, wherein the pneumatic fitting is in fluid communication with the inside of the tire, the method comprising:

rotating a bleeder valve, wherein in bleeder valve:
  is in supported connection with a body, wherein the body:
    has circumferential grove and is releasable connectable to the axle by a set screw cooperatively engaging the axle and the grooved; and
    is coaxially aligned with the axle centerline;
  in coaxially aligned connection with the axle centerline; and
  enables gas above a set pressure to pass to atmosphere; and
fluidly connecting the bleeder valve and the pneumatic fitting with a tube, whereby gas above the set pressure is relieved from the tire.

12. A method for controlling gas pressure inside a tire mounted on a wheel, being rotatable in operative connection with an axle, wherein the axle is rotatable about an axle centerline, and wherein the wheel is in supporting connection with a pneumatic fitting, wherein the pneumatic fitting is in fluid communication with the inside of tire, the method comprising:

rotating a bleeder valve, wherein the bleeder valve:
  is in supported connection with a body, wherein the body is:
    coaxially aligned with the axle centerline;
    has a fluid passage terminating at a first opening on a surface of the body and originating at a second opening on a surface of the body, and
  is coaxially aligned with the axle centerline; and
  enables gas above a set pressure to pass to atmosphere;
fluidly connecting the bleeder valve and the pneumatic fitting with a tube wherein the bleeder valve is in fluid connection with the first opening and the tube is in fluid connection with the second opening;
whereby gas above the set pressure is relieved from the tire.

13. The method of claim 12 wherein the first opening is in threaded connection with a coupling, and wherein the bleeder valve is in releasable connection with the coupling.

14. The method of claim 12 wherein the second opening is in threaded connection with a fitting, and wherein the tube is in releasable connection with the fitting.

15. The method of claim 12 wherein the first opening is in threaded connection with a coupling and wherein the second opening is in threaded connection with a fitting and wherein the bleeder valve is in releasable connection with the coupling and the tube is in releasable connection with the fitting.

16. The method of claim 12 wherein the body has a second passage terminating at a first opening on a surface of the body and originating at a second opening on a surface of the body, and wherein the tube passes through the second passage.

17. The method of claim 16 wherein the first opening of the first passage is in threaded connection with a coupling, and wherein the bleeder valve is in releasable connection with the coupling.

18. The method of claim 16 wherein the second opening of the first passage is in threaded connection with a fitting, and wherein the tube is in releasable connection with the fitting.

19. The method of claim 16 wherein the first opening of the first passage is in threaded connection with a coupling and wherein the second opening is in threaded connection with a fitting, and wherein the bleeder valve is in releasable connection with the coupling and the tube is in releasable connection with the fitting.

* * * * *